April 10, 1928.
H. B. SANKEY
1,665,642
TOOL HOLDER AND OTHER RECEPTACLE FOR USE ON MOTOR VEHICLES
Filed April 25, 1927
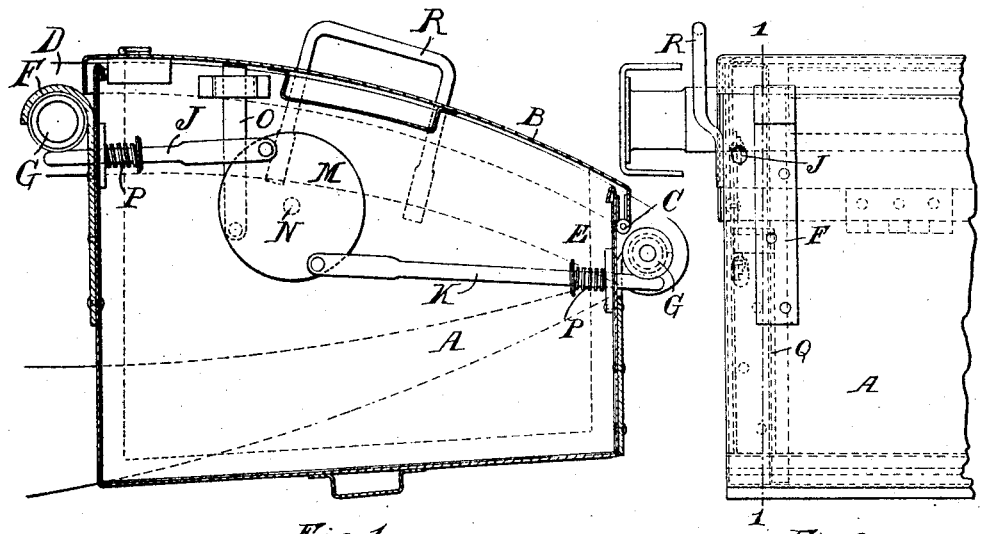
Fig.1.       Fig.2.
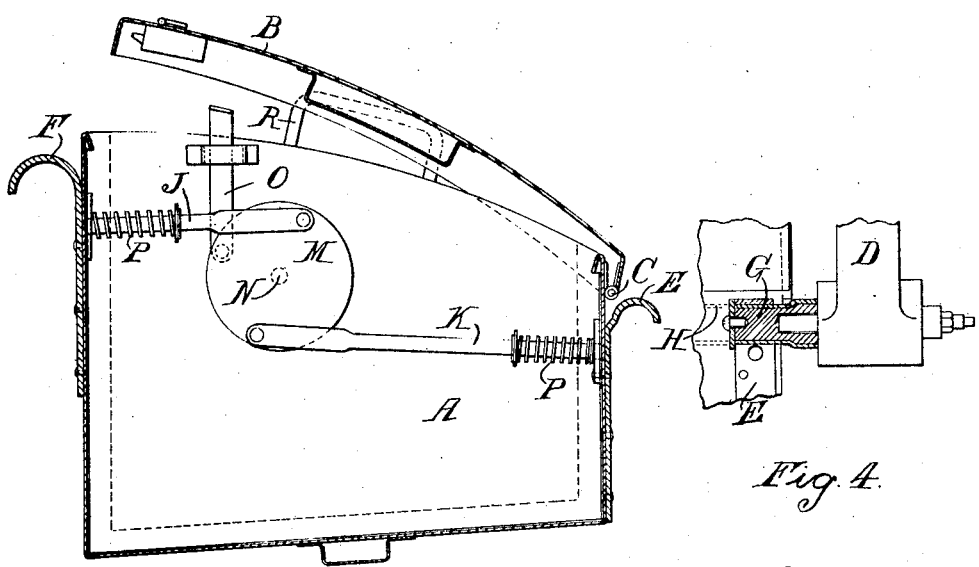
Fig.3.
Fig.4.
H. B. Sankey
By J. Harkom Patented Apr. 10, 1928.

1,665,642

UNITED STATES PATENT OFFICE.

HAROLD BANTOCK SANKEY, OF ALBRIGHTON, ENGLAND.

TOOL HOLDER AND OTHER RECEPTACLE FOR USE ON MOTOR VEHICLES.

Application filed April 25, 1927, Serial No. 186,496, and in Great Britain February 15, 1927.

This invention relates to tool holders or other receptacles mounted between the dumb irons, that is to say the forward extensions, of the chassis frame of a motor vehicle, and the object of the invention is to provide improved means for securing the receptacle to the vehicle frame with the special object of rendering it easily detachable.

According to this invention there are provided on each dumb iron, two projections extending inwardly towards the mid-plane of the vehicle, the one projection being situated towards the front of the dumb iron and the other towards the rear, and the receptacle is provided with forwardly and rearwardly extending hooks adapted to engage over the inward projections of the dumb irons. To secure the receptacle, after its hooks have been engaged, bolts, one in respect of each hook and placed thereunder, are caused to be moved outwards from the tool holder to engage under the projections.

A convenient application of the invention is described with reference to the drawings herewith of which:—

Figure 1 is a sectional view of a receptacle (for tools or other articles) adapted to be fitted between the dumb irons of a motor vehicle, the section being taken on the line 1, 1, of Figure 2.

Figure 2 is a fragmentary rear view of the receptacle shown in Figure 1.

Figure 3 is a view corresponding to Figure 1, but showing the lid as raised and the securing means out of engagement, and;

Figure 4 is a detached view illustrating, in section, one of the projections from the dumb iron to which the receptacle is attached.

In these drawings:—A is the main body of the receptacle which is provided with a lid B connecting with the body A by a hinge C. The shape of the lid B is arranged to conform more or less to the curve of the dumb irons D for the sake of appearance. On the forward face of the receptacle are two hooks E one of which is clearly shown in Figures 3 and 4; and on the rear of the receptacle are two similar hooks F. Each of these hooks engages with an inward projection G rigidly secured to the dumb iron and in the case of the forward ends of the dumb irons the projections may constitute the nuts for the bolts by which the springs are coupled to the dumb irons as clearly shown in Figure 4. As will be readily understood the projection at each end of one of the dumb irons may be connected across to the corresponding projection on the other side as indicated by broken lines at H in Figure 4. The receptacle is put in place between the dumb irons with the forward hooks E engaging over the forward projections G and the rearward hooks engaging over the rearward projections.

In order to keep the hooks in engagement with the projections, the receptacle is provided at each end with two bolts J, K, of which the bolt J is adapted to be projected through the rearward wall of the receptacle and come into position with its outer end underneath the corresponding projection G, while the other bolt K is adapted to project in a similar manner out through the front and beneath the corresponding front projection G. Each bolt is pivoted at its inner end to a disc M adapted to turn about a pivot centre N and being operated by a vertical bolt O which is also pivoted to the disc M. The bolts J and K are provided with coil springs P which constantly tend to press the bolts inwards and this has the effect of moving the bolt O upwards. When the lid B of the receptacle is closed, it presses down upon the bolt O rotating the disc in an anti-clockwise direction thus shooting out the bolts at the corresponding end of the receptacle. Partitions Q are provided at each end of the receptacle to protect the bolt operating device from the articles placed within the receptacle. R represents one of a pair of handles to facilitate lifting the receptacle.

Having fully described my invention what I claim and desire to secure by Letters Patent is:—

1. A receptacle adapted to be placed between the forward extensions of the side members of a motor vehicle frame, forwardly and rearwardly extending hooks on the receptacle, inwardly extending projections from the said forward extensions of the vehicle frame said hooks adapted to engage over said projections, and bolts sliding in relation to the receptacle and adapted to pass at their outer ends beneath the said projections from the chassis frame so as to secure the receptacle in position thereon.

2. A receptacle adapted to be placed between the forward extensions of the side members of a motor vehicle frame, forwardly and rearwardly extending hooks on the receptacle, inwardly extending projections from the said forward extensions of the vehicle frame, said hooks adapted to engage over said projections, bolts sliding in relation to the receptacle and adapted to pass at their outer ends beneath the said projections from the chassis frame so as to secure the receptacle in position thereon, and means by which the said bolts are automatically pressed out to secure the receptacle by the closing of the lid.

3. A receptacle adapted to be placed between the forward extensions of the side members of a motor vehicle frame, forwardly and rearwardly extending hooks on the receptacle, inwardly extending projections from the said forward extensions of the vehicle frame said hooks adapted to engage over said projections, bolts sliding in relation to the receptacle and adapted to pass at their outer ends beneath the said projections from the chassis frame so as to secure the receptacle in position thereon, a disc in respect of each end of the receptacle to which the inner ends of the said bolts are pivoted, and a third bolt pivoted to each disc, and arranged to be operated, by the closing of the lid, in a direction to cause the rotation of the disc to shoot out the bolts, and means whereby the bolts are moved inwards when the lid is opened.

In witness whereof I have hereunto signed my name this first day of April, 1927.

HAROLD BANTOCK SANKEY.